March 16, 1926.

J. SLEPIAN ET AL

RESONANT SHUNT

Filed March 5, 1921

1,576,860

WITNESSES:

INVENTORS
Joseph Slepian and
Charles LeG. Fortescue
BY

ATTORNEY

Patented Mar. 16, 1926.

1,576,860

UNITED STATES PATENT OFFICE.

JOSEPH SLEPIAN, OF SWISSVALE, AND CHARLES LE G. FORTESCUE, OF PITTSBURGH, PENNSYLVANIA, ASSIGNORS TO WESTINGHOUSE ELECTRIC AND MANUFACTURING COMPANY, A CORPORATION OF PENNSYLVANIA.

RESONANT SHUNT.

Application filed March 5, 1921. Serial No. 449,945.

*To all whom it may concern:*

Be it known that we, JOSEPH SLEPIAN, a citizen of the United States, and a resident of Swissvale, in the county of Allegheny and State of Pennsylvania, and CHARLES LE G. FORTESCUE, a citizen of the United States, and a resident of Pittsburgh, in the county of Allegheny and State of Pennsylvania, have invented a new and useful Improvement in Resonant Shunts, of which the following is a specification.

Our invention relates to the application of resonant shunts to intelligence-transmission circuits, such as telephones or telegraphs, to prevent inductive interference from an adjacent alternating-current railway circuit.

By the term "resonant shunt" we refer to a device, such as a static network, designed to offer substantially no impedance to the flow of current of a particular frequency and relatively high impedance to the flow of current of all other frequencies.

One object of our invention is to provide a device of the above-indicated character comprising an induction generator having its primary winding connected with the telephone or telegraph circuit to be protected and also connected in circuit with a capacitance device, such as a condenser, the generator being driven above synchronous speed to supply its own losses and those of the condenser, thus forming a perfect resonant shunt.

Another object of our invention is to provide an apparatus of the class set forth, together with means for automatically regulating the apparatus in such manner that the resonant shunt is effective to prevent the flow of currents of a frequency corresponding to that of the railway circuit, irrespective of variations of such frequency.

Figure 1:
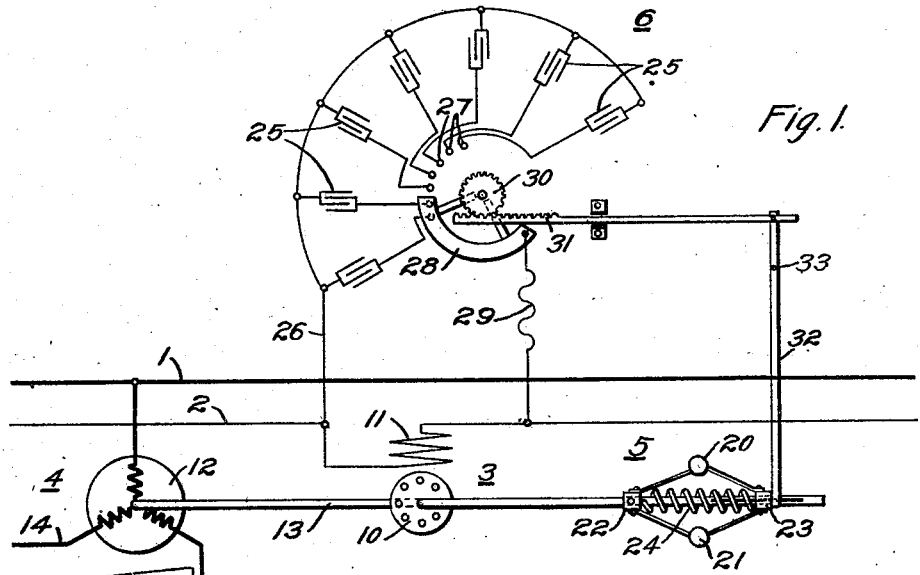
Figure 2:
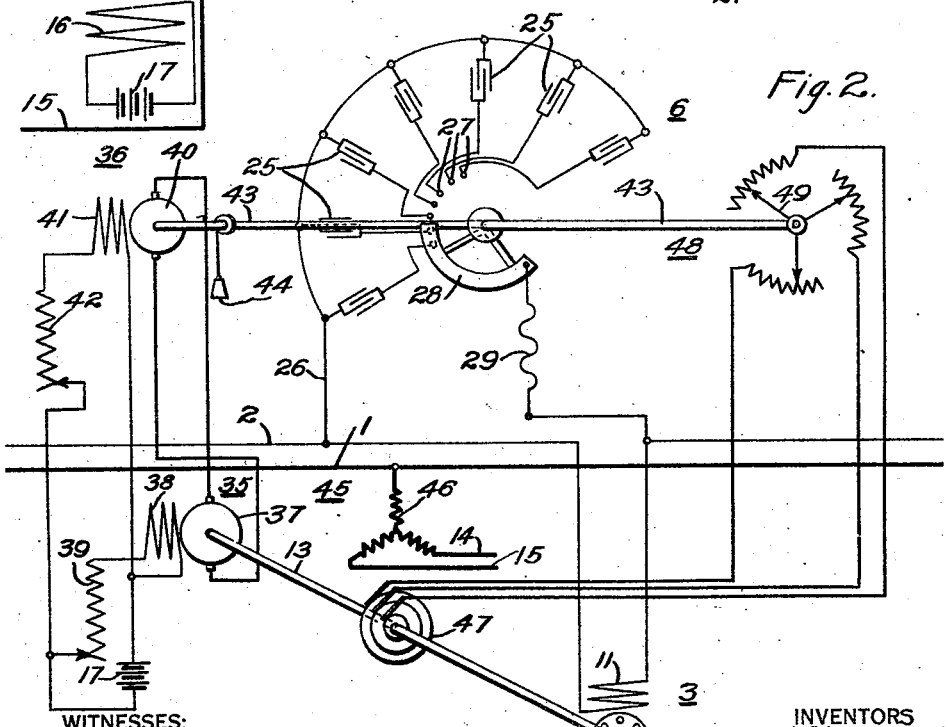

Other and more specific objects of our invention will become evident from the following detailed description, taken in conjunction with the accompanying drawing, Figure 1 of which is a diagrammatic view of an electrical system organized in accordance with one form of our present invention; and Fig. 2 is a similar view of a modification of our invention.

Referring to Fig. 1 of the drawing, the system here shown comprises a main supply-circuit conductor 1, which may be a trolley conductor of a single-phase railway circuit, an intelligence-transmission conductor 2, such as a telephone or telegraph wire that extends alongside the railway track (not shown), in accordance with customary practice, and an induction generator 3 that is driven by suitable means, such as a synchronous motor 4, from the railway supply circuit to prevent inductive interference between the railway and intelligence conductors 1 and 2, respectively. In addition, a speed regulator 5 for governing a variable capacitance device 6 is provided to automatically regulate the action of the inductive-interference-preventive means, as hereinafter set forth in detail.

The induction generator 3 may comprise a squirrel-cage rotor 10 that is closely coupled with a single-phase primary or stator winding 11, which is here shown as connected in series relation with the telephone or telegraph conductor 2 and in parallel relation to the capacitance device 6.

The synchronous motor 4 comprises suitable stator and rotor windings, such as 12 and 16, which are respectively supplied with energy from a three-phase circuit, including the railway trolley conductor 1 and conductors 14 and 15 and from a suitable direct-current source, such as a storage battery 17. It will be understood that, in actual practice, the direct-current-field winding 16 will preferably be placed upon the rotor of the synchronous motor, although this construction is not essential to the operation of our invention.

The synchronous motor 4 is suitably connected to drive the induction generator 3, as by means of a shaft 13 that may also be mounted upon the mechanical regulating device 5, which is here shown as being of the familiar fly-ball-governor type.

In order to drive the induction generator 3 at a sufficient percentage above the synchronous speed corresponding to the number of poles thereof, the synchronous motor 4 is provided with one or more pairs of poles less than the induction generator. By the proper selection of the pole ratio between the two machines, the proper speed for the induction motor will be obtained, whereby it will be adapted to supply its own losses and also those of the parallel-connected capacitance device 6, thereby forming a perfect resonant shunt to obstruct, that is, to offer an infinite impedance to the passage of frequencies corresponding to the frequency of the power supply circuit 1. Furthermore, the admittance to other frequencies will be relatively high, by reason of the close coupling between the primary and the secondary windings of the induction generator. It will be understood that the generator should not be driven so far above synchronism as to become self-exciting in combination with the capacitance device 6. It will be understood that other types of driving motors may be employed, if desired: for example, an induction motor, as shown in Fig. 2, or a single-phase series commutator motor.

To obtain a resonant shunt that automatically varies in accordance with the changes of frequency in the railway supply circuit, thus, at all times, preventing the passage of frequencies corresponding to that of the railway circuit, and, consequently, continuously preventing inductive interference in the intelligence-transmission system, we provide the device 5 for regulating or governing the capacity of the condensive device 6, as hereinafter set forth in detail.

The governing device 5 is shown as comprising a plurality of balls or weights 20 and 21 which are linked, in a familiar manner, with a block or collar 22 that is rigidly secured to the machine shaft 13, and also to a second block or collar 23 that is longitudinally slidable on the shaft 13 or on a shaft that is driven synchronously therewith. The balls or weights 20 and 21 are adapted to be spread apart by the centrifugal force of the rotating device 5 in opposition to the action of a tension spring 24 that is coiled around the shaft 13. It will be understood that, while we have illustrated the regulating device 5 as being of the familiar fly-ball-governor type, any other apparatus for effecting a regulating movement in accordance with variations of machine speed may be employed, if desired.

The capacitance device 6 may comprise a plurality of condensers 25 that are arranged in radial relation, and one terminal of each of which is connected to a conductor 26 which leads to one terminal of the primary or stator winding 11 of the induction generator. The other terminals 27 of the condensers 25 are normally disconnected, but are adapted to be connected by a movable arcuate contact strip 28 which is connected, by means of a flexible conductor 29, to the other terminal of the primary winding 11 of the induction generator. Thus, any selected number of condensers may be connected in parallel relation to provide the desired capacitance.

The contact strip 28 is suitably secured to a rotatable pinion 30 which is centrally located with respect to the several condenser terminals 27. A rack 31 is shown as meshing with the underside of the pinion 30 and is pivotally connected to a swinging rod 32, which is pivotally mounted upon a stationary pin 33. The lower end of the rod 32 is rigidly secured to the sliding block 23 of the fly-ball governor 5.

Consequently, an increase in the speed in the illustrated motor-generator set will cause the balls or weights 20 and 21 to fly outwardly and actuate the rod 32 and the rack 31 in such manner as to rotate the pinion 30 in a counter-clockwise direction, thus decreasing the number of parallel-connected condensers 25. In other words, the total capacity of the condensive device 6 varies inversely with the speed of the induction generator 3; that is to say, inversely with the frequency of the railway circuit 1 from which the synchronous motor 4 is fed.

By reason of the illustrated regulating apparatus, the induction generator 3 is always combined with the proper amount of capacitance from the condensive device 6 to produce a shunt circuit that is resonant to the particular frequency that obtains in the railway circuit at any instant.

Whereas, in Fig. 1 we have shown a mechanical means for properly varying the amount of capacitance in parallel relation to the induction generator 3, in Fig. 2 we have illustrated an electrical means for accomplishing a similar object.

In Fig. 2, the induction generator 3 and the capacitance device 6 are provided and connected as in the system shown in Fig. 1, while an induction motor 45 is employed in lieu of the synchronous motor 4 that is shown in Fig. 1. In addition, a small direct-current generator 35 is driven synchronously with the machine shaft 13 to supply energy to a small direct-current torque motor 36 that is adapted to directly drive the arcuate contact strip 28 of the capacitance device 6.

The direct-current generator 35 may comprise an armature 37 that is mounted directly upon the machine shaft 13, a shunt field winding 38 being provided therefor and being connected, through a variable resistor 39, across any suitable source of energy, such as the storage battery 17. The direct-current torque motor 36 may be of a similar type comprising an armature 40 and a shunt field winding 41 that is connected through a variable resistor 42 to the terminals of the battery 17. The armature 40 may be mechanically coupled to the movable contact strip 28 in any suitable manner, as by a shaft 43. Furthermore, the motor 36 works in opposition to restoring means, such as a weight 44, in accordance with usual practice.

It will be understood that the direct-current torque motor 36 is shown for illustrative purposes only and that any other device, the displacement of which is proportional to the voltage applied thereto, may be employed for the desired purpose.

The induction motor 45 comprises a primary or stator winding 46 that is connected to the three-phase supply-circuit conductors 1, 14 and 15 and further comprises a secondary or rotor winding 47 of the slipring type. A three-section variable resistor 48 is connected in circuit with the secondary winding 47 of the induction motor, for the familiar speed-varying purpose.

The resistor is associated with a suitable three-part switching device 49 whereby the three phases of the secondary winding 47 may be simultaneously varied in resistance value. The switching device 49 may be directly mounted upon the shaft 43 of the variable capacitance device 6.

The relation of parts is such that the inclusion of a greater number of condensers 25 will, through the agency of the switching device 49, effect a decrease of the secondary resistor 48 and, therefore, an increased speed of the induction motor 45. It will be understood that the induction motor 45 is provided with one or more pairs of poles less than the induction generator 3, as was the case with the synchronous motor 4, whereby the generator may be driven above synchronous speed.

The purpose of the apparatus just described is to provide means for automatically varying the speed of the driving motor 45 in accordance with the losses corresponding to any position of the variable capacitance device 6. In this way, automatic compensation for such losses is provided to insure proper operation of the induction generator 3, thus effecting practically complete elimination of interfering frequencies in the telegraph or other intelligence-transmission conductor 2.

It will be understood that any other device for performing a function similar to that just set forth may be employed if desired.

The operation of the apparatus shown in Fig. 2 may be briefly set forth as follows: Upon an increase of speed of the induction motor 45 by reason of increased frequency in the railway supply circuit 1, the direct-current generator 35 is correspondingly raised in speed to proportionately increase the voltage and degree of displacement of the torque motor 36, whereby the armature 40 is rotated in a counter-clockwise direction to decrease the number of condensers 25 that are connected in parallel relation, or, in other words, to vary the capacity that is actively connected across the induction generator winding 11 inversely to the variation of frequency in the railway supply conductor 1.

Furthermore, the speed of the driving induction motor 45 is automatically increased in accordance with the losses corresponding to the various positions of the capacitance device 6. This statement will become evident from the following explanation. As the contact strip 28 is rotated in a clockwise direction, for example, to gradually increase the number of condensers 25 that are connected in parallel relation, thereby increasing the losses in the resonant shunt circuit, the switching device 49 is rotated in the same direction to correspondingly decrease the active values of the sections of the secondary resistor 48. Consequently, the speed of the driving induction motor 45 is increased to just the extent necessary to overcome or compensate for the additional losses entailed by the operation of the capacitance device 6 to its new position.

In this way, the desired automatic maintenance of a shunt circuit that is resonant to the frequency that obtains in the railway circuit at any instant is secured.

It will be understood that various other methods, both electrical and mechanical, may be employed for effecting the desired automatic operation without departing from the spirit and scope of the present invention. Consequently, we do not wish to be restricted to the specific circuit connections, structural details or arrangement of parts herein set forth, but to be limited only by the scope of the appended claims.

We claim as our invention:

1. The combination with a plurality of adjacent conductors corresponding to different circuits, of means for preventing inductive interference in one of said circuits comprising an asynchronous machine having one winding connected in said one circuit.

2. The combination with a power conductor and an adjacent intelligence-transmission conductor, of means for preventing inductive interference in the circuit of said intelligence conductor comprising an induction generator operating above synchronous speed and having one winding connected in circuit with said intelligence conductor.

3. The combination with a power conductor and an adjacent intelligence-transmission conductor, of means for preventing inductive interference in the circuit of said intelligence conductor comprising an induction generator operating above synchronous speed and having its stator winding in series relation with said intelligence conductor.

4. The combination with a power conductor and an adjacent intelligence-transmission conductor, of means for preventing inductive interference in the circuit of said intelligence conductor comprising an induction generator having one winding in circuit with said intelligence conductor and a motor energized from said power conductor for driving said generator.

5. The combination with a plurality of adjacent conductors corresponding to different circuits, of means for preventing inductive interference in one of said circuits comprising an asynchronous machine having one winding connected in said one circuit and means energized from the other circuit for driving said machine.

6. The combination with a plurality of adjacent conductors corresponding to different circuits, of means for preventing inductive interference in one of said circuits comprising an asynchronous machine having one winding connected in said one circuit and a motor fed from the other circuit for driving said machine above synchronous speed.

7. The combination with a power conductor and an adjacent intelligence-transmission conductor, of means for preventing inductive interference in the circuit of said intelligence conductor comprising an induction generator having one winding in series relation with said intelligence conductor and a motor energized from said power conductor for driving said generator above synchronous speed.

8. The combination with a plurality of adjacent conductors corresponding to different circuits, of means for preventing inductive interference in one of said circuits comprising an asynchronous machine having one winding connected to said one circuit and a capacitance device in circuit with said winding.

9. The combination with a plurality of adjacent conductors corresponding to different circuits, of means for preventing inductive interference in one of said circuits comprising an asynchronous machine having one winding connected in said one circuit and a movable capacitance device in parallel relation to said writing.

10. The combination with a power conductor and an adjacent intelligence-transmission conductor of means for preventing inductive interference in the circuit of said intelligence conductor comprising an induction generator having one winding in circuit with said intelligence conductor and a capacitance device in circuit with said winding.

11. The combination with a power conductor and an adjacent intelligence-transmission conductor, of means for preventing inductive interference in the circuit of said intelligence conductor comprising an induction generator having one winding in series relation with said intelligence conductor and a variable capacitance device in parallel relation to said winding.

12. The combination with a power conductor and an adjacent intelligence-transmission conductor, of means for preventing inductive interference in the circuit of said intelligence conductor comprising an induction generator having its stator winding in series relation with said intelligence conductor and having a capacitance device in shunt relation to said winding, and a motor for driving the rotor of said generator above synchronous speed.

13. The combination with a power conductor and an adjacent intelligence-transmission conductor, of means normally adapted to prevent inductive interference in the circuit of said intelligence conductor, and means for varying the first named means to automatically compensate for variations in the frequency of the power circuit.

14. The combination with a power conductor adapted to receive a variable-frequency current and an adjacent intelligence-transmission conductor, of a circuit comprising inductive and condensive elements associated with said intelligence conductor, and means for automatically maintaining said circuit elements resonant to the variable frequency of the current traversing said power conductor.

15. The combination with a power conductor adapted to receive a variable-frequency-current and an adjacent intelligence-transmission conductor, of a circuit included in said intelligence conductor and resonant to the normal frequency of said power conductor and including a winding of an asynchronous machine, and means for automatically varying the speed of said machine to compensate in said resonant circuit for variations in the frequency of the current-traversing said conductor.

16. The combination with a power conductor adapted to receive a variable-frequency-current and an adjacent intelligence-transmission conductor, of a circuit in series relation with said intelligence conductor and resonant to the normal frequency of said power conductor and including the stator winding of an induction generator, and driving means for said generator having its speed dependent upon the frequency of the current traversing said power conductor to automatically compensate in said resonant circuit for variations in such frequency.

17. The combination with a plurality of adjacent conductors corresponding to different circuits, of means for preventing inductive interference in one of said circuits comprising an asynchronous machine having one winding connected to said one circuit and a variable capacitance device in circuit with said winding, and means for varying the speed of said machine in accordance with the active value of said capacitance device.

18. The combination with a plurality of adjacent conductors corresponding to different circuits, of means for preventing inductive interference in one of said circuits comprising an asynchronous machine having one winding connected to said one circuit and a variable capacitance device in circuit with said winding and means for varying the speed of said machine to compensate for the losses caused by said capacitance device.

19. The combination with a power conductor and an adjacent intelligence-transmission conductor, of means for preventing inductive interference in the circuit of said intelligence conductor comprising an induction generator having one winding in circuit with said intelligence conductor and a variable capacitance device in circuit with said winding and means for varying the speed of said machine in accordance with the active value of said capacitance device.

20. The combination with a power conductor and an adjacent intelligence-transmission conductor, of means for preventing inductive interference in the circuit of said intelligence conductor comprising an induction generator having one winding in series relation with said intelligence conductor and a variable capacitance device in parallel relation to said winding and means for varying the speed of said machine to compensate for the losses caused by said capacitance device.

21. The combination with a power conductor and an adjacent intelligence-transmission conductor, of means for preventing inductive interference in the circuit of said intelligence conductor comprising an induction generator having one winding in series relation with said intelligence conductor and a variable capacitance device in parallel relation to said winding, a motor for driving the rotor of said generator above synchronous speed and means for varying the speed of said motor to compensate for the losses caused by said capacitance device.

22. The combination with a power conductor and an adjacent intelligence-transmission conductor, of means comprising a capacitance device for preventing inductive interference in the circuit of said intelligence conductor irrespective of the losses caused by said device.

23. The combination with a power conductor and an adjacent intelligence-transmission conductor, of means comprising a variable capacitance device normally adapted to prevent inductive interference in the circuit of said intelligence conductor and means for varying the first-named means to automatically compensate for losses caused by said device.

24. The combination with a plurality of adjacent conductors corresponding to different circuits, of means for preventing inductive interference in one of said circuits comprising an asynchronous machine having one winding connected to said one circuit and a capacitance device in circuit with said winding and means responsive to variations of said device for correspondingly varying the machine speed.

25. The combination with a power conductor and an adjacent intelligence-transmission conductor, of means for preventing inductive interference in the circuit of said intelligence conductor comprising an induction generator having one winding in circuit with said intelligence conductor and a variable capacitance device in circuit with said winding and means responsive to variations of said device for correspondingly varying the machine speed.

26. The combination with a power conductor and an adjacent intelligence-transmission conductor, of means for preventing inductive interference in the circuit of said intelligence conductor comprising an induction generator having one winding in circuit with said intelligence transmission conductor and a multiposition condenser device in circuit with said winding, a driving motor for said generator and means for varying the speed of said motor in accordance with the losses corresponding to any position of said condenser device.

In testimony whereof, we have hereunto subscribed our names this 28th day of February, 1921.

JOSEPH SLEPIAN.
CHARLES LE G. FORTESCUE.